C. B. SHOEMAKER.
EYE SHADE.
APPLICATION FILED JUNE 1, 1917.
1,255,057.
Patented Jan. 29, 1918.
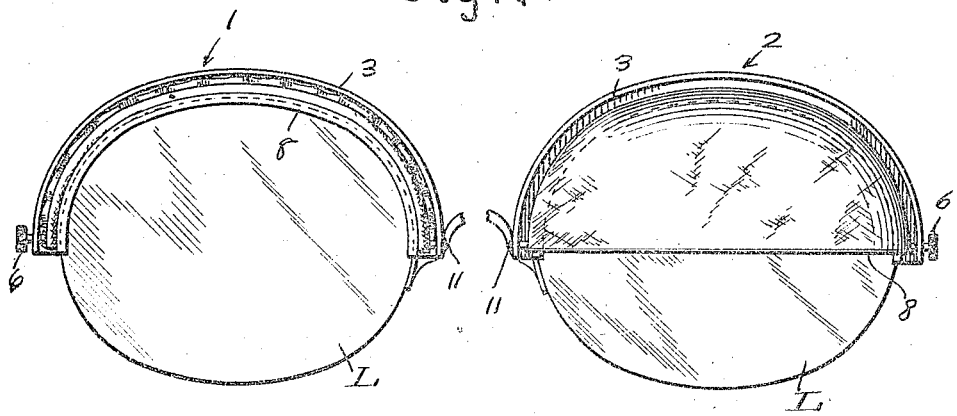
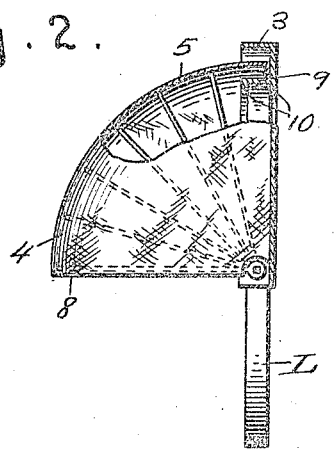
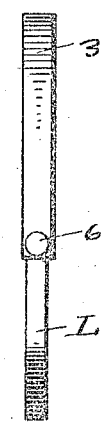
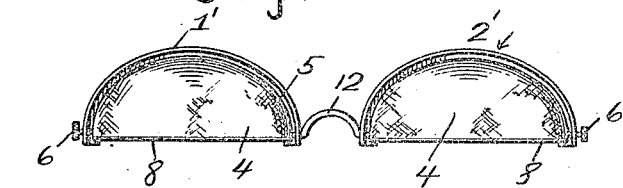
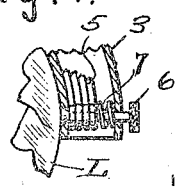
WITNESSES
L. B. James
S. M. McColl
INVENTOR
Clifton B. Shoemaker
BY
ATTORNEY

UNITED STATES PATENT OFFICE.

CLIFTON B. SHOEMAKER, OF GLENDORA, CALIFORNIA.

EYE-SHADE.

1,255,057.  Specification of Letters Patent.  Patented Jan. 29, 1918.

Application filed June 1, 1917. Serial No. 172,291.

*To all whom it may concern:*

Be it known that I, CLIFTON B. SHOEMAKER, a citizen of the United States, residing at Glendora, in the county of Los Angeles and State of California, have invented certain new and useful Improvements in Eye-Shades, of which the following is a specification.

This invention relates to eye vizors or shades, and more particularly to those employed in connection with eyeglasses which latter term also is designed to include spectacles.

The primary object of the invention is to provide a simple and efficient shade of this character so constructed as to be supported by the nose of the wearer, the preferred form of which is applicable to the upper edges of the lens of eyeglasses, and is operable to intercept all vertical or horizontal rays of light, whether emanating from above, in front or at either side of the wearer's eyes; and it is also especially useful for preventing the reflection and refraction of artificial light, when reading, or working thereby.

Another object is to provide a shade of this character, the shade elements of which are collapsible, and adapted when not in use of fold fan-like into a casing of minimum size supported above the eyes of the wearer; and owing to its small size is unobjectionable to wear when not in use, and thereby provided for the ready access thereto, when desired for use.

Another object is to provide simple and efficient means for retaining the shade elements in housed inoperative position, and for securing them to the lens of the glass in connection with which they are to be used.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:

Figure 1 represents a front elevation of a pair of eyeglasses equipped with this improved shade, one element of which is shown in lowered operative position, and the other in raised inoperative position, the nosepiece of the glass being broken out for convenience in illustration.

Fig. 2 is an end view thereof with parts broken out, the shade element or vizor being in lowered operative position.

Fig. 3 is a similar view, with shade element closed.

Fig. 4 is an enlarged detail sectional view, taken through one end of the casing of a shade element.

Fig. 5 is a front elevation showing a slightly different form of the invention.

In the embodiment illustrated in Figs. 1 to 4, the shade constituting this invention is shown applied to a pair of eyeglasses, while in Fig. 5 it is shown constructed for use by those who do not use glasses. In both forms, two shade elements 1 and 2 are employed, the structure of each in both forms is exactly the same, the only difference being in the two forms is that in the form designated for use without glasses, the nose-piece connects the shade elements, while in the form used in connection with glasses, said elements are mounted on the lens of the glasses, and the nose-piece of the glasses connects them. Each shade element comprises an arcuate casing 3, the curvature of which conforms to the upper edge of a lens L, and which is closed at its top, bottom and rear, and open at the front as is shown clearly in Figs. 1 and 2.

A collapsible vizor 4 is carried by each casing 3, and is constructed in the form of a spherical segment with its convexity disposed outwardly. These segments or vizors may be made of any suitable flexible material which will exclude or modify the rays of light and they are braced and reinforced by a plurality of arcuate ribs 5, any desired number of which may be employed, and which extend from end to end of each vizor and converge toward their ends, said ends lapping as shown in Fig. 4 and disposed on a pintle here shown in the form of a set screw 6, which passes transversely through the top of the casing 3 and is engaged with the rear wall thereof. A coil spring 7 is preferably arranged on the screw 6, between the top wall of the casing, and the outermost rib 5 as is shown clearly in Fig. 4 and exerts its tension to hold said ribs in yieldable frictional engagement, so that when the vizor or shade 4 is collapsed and folded into the casing 3, the frictional engagement of said rib ends will operate to hold it in such position, the tension of the spring being varied by tightening the set screw.

Each of these vizors 4 is preferably provided around its free or lower edge with a reinforcing bead 8, although it need not necessarily be so provided, and is preferably formed by one of the ribs 5 as is shown clearly in Fig. 2.

In the form which is designed for application to the edges of the eyeglass lens, the bottom or lower wall 9 of the casing 3 is provided with laterally spaced flanges as 10, extending around the margin of said bottom, and which is designed to fit over the edges of the eyeglass lens as is shown clearly at the left of Fig. 1 and which operates to assist in retaining the shade element in position on the lens.

The screws 11 which are employed at the inner ends of the casings, operate as pintles for the ribs 5 of the shade elements, and also to assist in clamping said elements on the lens.

From the above description, it will thus be seen that these vizors or shade elements 4 may be folded and housed within the casing 3 when not in use, which is shown clearly at the left of Fig. 1 and in Fig. 3, and that they may be held in housed inoperative position by tightening up the set screw 6, said screws having threaded engagement with the casing 3. When it is desired to use these elements the screws 6 are loosened, and the curtain-like vizors will open downwardly into the position shown clearly at the right of Fig. 1 and in Fig. 2.

In Fig. 5, the structure of the shade is exactly the same as that shown in the other figures, except that the shade elements 1' and 2' are connected at their inner ends by a nose-piece 12 which operates to support these members in position on the nose of the wearer. The form of invention being designed especially for those who do not use eyeglasses. When this form is employed, of course, the casings 3 do not have the flanges 10 as there is no use for them, and the ends of the nose-piece 12 are extended through the casing and engage the lapping inner ends of the ribs and operate as pintles therefor in a manner similar to that in which the screws 11 operate in the other figures.

From the foregoing description, taken in connection with the accompanying drawing, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:

1. An eye shade comprising a nose engaging support, a housing carried by said support and a collapsible shade element carried by said housing and adapted to be incased therein, when not in use.

2. An eye shade comprising a nose engaging support, a housing carried by said support a collapsible shade element carried by said housing and adapted to be incased therein, when not in use, and means for frictionally holding said shade element in collapsed position within said housing.

3. An eye shade comprising a pair of shade elements, each fashioned in the form of spherical segments, of flexible material, and arcuate longitudinally extending, reinforcing ribs carried by said elements, with their ends lapping and pivotally connected.

4. An eye shade comprising a pair of shade elements, each fashioned in the form of spherical segments, of flexible material, arcuate longitudinally extending reinforcing ribs carried by said elements, with their ends lapping and pivotally connected, and yieldable means for frictionally holding said lapped ends in adjusted position.

5. An eye shade comprising a pair of shade elements, each fashioned in the form of spherical segments, of flexible material, arcuate longitudinally extending reinforcing ribs carried by said elements, with their ends lapping and pivotally connected, said elements being flexible transversely and means to retain them in folded position.

6. An eye shade comprising a pair of shade elements, each fashioned in the form of a transversely and longitudinally curved segment, of flexible material, a casing shaped to conform to one edge of one of said elements and in which said element is designed to be housed, said casing having means for detachably mounting it on the upper edge of an eyeglass lens, and means for holding said elements in folded position in said casing.

In testimony whereof I affix my signature in presence of two witnesses.

CLIFTON B. SHOEMAKER.

Witnesses:
WALTER L. WILEY,
C. W. CHAMBERLAIN.